(12) United States Patent
Ward et al.

(10) Patent No.: US 10,901,743 B2
(45) Date of Patent: Jan. 26, 2021

(54) SPECULATIVE EXECUTION OF BOTH PATHS OF A WEAKLY PREDICTED BRANCH INSTRUCTION

(71) Applicant: INTERNATIONAL BUSINESS MACHINES CORPORATION, Armonk, NY (US)

(72) Inventors: Kenneth L. Ward, Austin, TX (US); Dung Q. Nguyen, Austin, TX (US); Susan E. Eisen, Round Rock, TX (US); Hung Le, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/039,857

(22) Filed: Jul. 19, 2018

(65) Prior Publication Data
US 2020/0026520 A1    Jan. 23, 2020

(51) Int. Cl.
*G06F 9/38*     (2018.01)

(52) U.S. Cl.
CPC .......... *G06F 9/3844* (2013.01); *G06F 9/3851* (2013.01); *G06F 9/3855* (2013.01); *G06F 9/3861* (2013.01)

(58) Field of Classification Search
None
See application file for complete search history.

(56) References Cited

U.S. PATENT DOCUMENTS

| | | | | | |
|---|---|---|---|---|---|
| 4,439,827 | A | * | 3/1984 | Wilkes | G06F 9/267 712/235 |
| 5,165,025 | A | * | 11/1992 | Lass | G06F 9/3804 712/235 |
| 5,634,103 | A | * | 5/1997 | Dietz | G06F 9/3836 712/235 |
| 5,696,958 | A | * | 12/1997 | Mowry | G06F 9/3804 712/23 |
| 5,740,417 | A | * | 4/1998 | Kennedy | G06F 1/3203 712/239 |
| 5,860,017 | A | * | 1/1999 | Sharangpani | G06F 9/3804 712/218 |
| 6,065,115 | A | * | 5/2000 | Sharangpani | G06F 9/3804 712/217 |

(Continued)

OTHER PUBLICATIONS

'Reducing the Branch Penalty in Pipelined Processors' by David J. Lilja, Jul. 1988. (Year: 1988).*

(Continued)

*Primary Examiner* — Steven G Snyder
(74) *Attorney, Agent, or Firm* — Cantor Colburn LLP; Bryan Bortnick

(57) ABSTRACT

Systems, methods, and computer-readable media are described for performing speculative execution of both paths/branches of a weakly predicted branch instruction. A branch instruction may be fetched from an instruction queue and determined to be a weakly predicted branch instruction, in which case, both paths of the branch instruction may be dispatched and speculatively executed. When the actual path taken becomes known, instructions corresponding to the path not taken may be flushed. Instructions from both paths of a weakly predicted branch instruction that are speculatively executed may be dispatch and executed in an interleaved manner.

20 Claims, 3 Drawing Sheets

(56) References Cited

U.S. PATENT DOCUMENTS

| | | | |
|---|---|---|---|
| 7,035,997 B1* | 4/2006 | Musoll | G06F 9/3802 |
| | | | 712/205 |
| 7,143,403 B2* | 11/2006 | Hank | G06F 8/433 |
| | | | 717/159 |
| 7,471,574 B2 | 12/2008 | Park | |
| 7,587,580 B2 | 9/2009 | Sartorius et al. | |
| 7,673,123 B2* | 3/2010 | Hastie | G06F 9/3844 |
| | | | 712/239 |
| 7,844,806 B2 | 11/2010 | Loschke et al. | |
| 7,877,587 B2* | 1/2011 | Vasekin | G06F 9/30101 |
| | | | 712/240 |
| 8,099,586 B2 | 1/2012 | Chou et al. | |
| 9,069,565 B2* | 6/2015 | Ito | G06F 9/3806 |
| 9,229,723 B2* | 1/2016 | Bonanno | G06F 9/3806 |
| 9,239,721 B2* | 1/2016 | Bonanno | G06F 9/3806 |
| 9,304,768 B2 | 4/2016 | Ruehle | |
| 9,348,599 B2* | 5/2016 | Busaba | G06F 9/3844 |
| 9,361,110 B2* | 6/2016 | Lin | G06F 9/322 |
| 9,389,868 B2* | 7/2016 | Gschwind | G06F 9/3017 |
| 9,477,479 B2 | 10/2016 | Greenhalgh | |
| 9,519,485 B2* | 12/2016 | Busaba | G06F 9/3804 |
| 9,952,869 B2* | 4/2018 | Jacob (Yaakov) | G06F 9/3804 |
| 10,346,172 B2* | 7/2019 | Bonanno | G06F 9/3844 |
| 2003/0023838 A1* | 1/2003 | Karim | G06F 9/3804 |
| | | | 712/235 |
| 2004/0111592 A1* | 6/2004 | Nagao | G06F 9/3804 |
| | | | 712/235 |
| 2006/0179292 A1* | 8/2006 | Hastie | G06F 9/3844 |
| | | | 712/239 |
| 2007/0288732 A1* | 12/2007 | Luick | G06F 9/382 |
| | | | 712/237 |
| 2007/0288735 A1* | 12/2007 | Vasekin | G06F 9/3848 |
| | | | 712/239 |
| 2013/0332715 A1* | 12/2013 | Bonanno | G06F 9/3848 |
| | | | 712/240 |
| 2014/0082339 A1* | 3/2014 | Bonanno | G06F 9/3848 |
| | | | 712/240 |
| 2014/0122836 A1* | 5/2014 | Gschwind | G06F 9/3017 |
| | | | 712/205 |
| 2016/0313994 A1 | 10/2016 | Scott et al. | |
| 2016/0378661 A1* | 12/2016 | Gray | G06F 11/3024 |
| | | | 712/237 |
| 2017/0090936 A1 | 3/2017 | Al Sheikh et al. | |
| 2017/0286116 A1 | 10/2017 | Johar et al. | |
| 2017/0337062 A1 | 11/2017 | Friedmann et al. | |
| 2018/0203704 A1* | 7/2018 | Bonanno | G06F 9/3844 |
| 2020/0004542 A1* | 1/2020 | Chauhan | G06F 9/3806 |

OTHER PUBLICATIONS

'Dynamic Branch Prediction' by Professor Ben Lee, archive from oregonstate.edu on Jun. 24, 2017. (Year: 2017).*

'Branch prediction' pseudo-transcript for a talk on branch prediction given at Two Sigma on Aug. 22, 2017, Dan Luu. (Year: 2017).*

'Confidence Estimation for Speculation Control' by Dirk Grunwald et al., copyright 1998, IEEE. (Year: 1998).*

'Linear Branch Entropy: Characterizing and Optimizing Branch Behavior in a Micro-Architecture Independent Way' by Sander De Pestel et al., IEEE Transactions on Computers, vol. 66, No. 3, Mar. 2017. (Year: 2017).*

M.Gebhart et al. (Mar. 2009). An evaluation of the TRIPS computer system. In ACM Sigplan Notices (vol. 44, No. 3, pp. 1-12).

* cited by examiner

SPECULATIVE EXECUTION OF BOTH PATHS OF A WEAKLY PREDICTED BRANCH INSTRUCTION

BACKGROUND

The present invention relates generally to branch prediction, and more particularly, to speculative execution of both paths of a branch instruction.

Branch prediction may be implemented to achieve higher performance in pipelined computer architectures. Branch prediction may involve making a prediction as to which path of a branch (e.g., an if-then-else structure) will be taken before the path actually taken is definitively known. Two-way branching is typically implemented with a conditional jump instruction. A conditional jump involves two potential paths. In particular, the conditional jump can either be "not taken," in which case, execution continues with the first branch of code which immediately follows the conditional jump instruction or it can be "taken," in which case, execution jumps to a different place in program memory where the second branch of code is stored.

It is not known with certainty whether a conditional jump will be taken or not taken until the condition has been calculated and the conditional jump has passed the execution stage in the instruction pipeline. Without branch prediction, a processor would have to wait until the conditional jump instruction has passed the execute stage before the next instruction can enter the fetch stage in the pipeline. A branch predictor—which is a digital circuit configured to implemented branch prediction—seeks to avoid these wasted clock cycles by attempting to guess whether the conditional jump is more likely to be taken or not taken. The branch that is guessed to be the more likely branch to be taken is then fetched and executed. If it is later detected that the guess was wrong, then the executed instructions are discarded (flushed) and the pipeline starts over with the correct branch, incurring a delay. The delay incurred as a result of a branch misprediction is equal to the number of stages in the pipeline from the fetch stage to the execute stage. Modern microprocessors tend to have long pipelines such that the misprediction delay is typically between 10 and 20 clock cycles.

SUMMARY

In one or more example embodiments, a method for speculative execution of a branch instruction is disclosed. The method includes fetching the branch instruction and determining that the branch instruction is weakly predicted. Upon determining that the branch instruction is a weakly predicted branch instruction, a first path and a second path of the branch instruction may both be dispatched. Then, a first set of instructions in the first path of the branch instruction and a second set of instructions in the second path of the branch instruction may be executed. The method finally includes determining that the first path of the branch instruction is the path taken and flushing the second set of instructions in the second path of the branch instruction.

In one or more other example embodiments, a system for speculative execution of a branch instruction is disclosed. The system includes at least one memory storing computer-executable instructions and at least one processor, the at least one processor being configured to access the at least one memory and execute the computer-executable instructions to perform a set of operations. The operations include fetching the branch instruction and determining that the branch instruction is weakly predicted. Upon determining that the branch instruction is a weakly predicted branch instruction, a first path and a second path of the branch instruction may both be dispatched. Then, a first set of instructions in the first path of the branch instruction and a second set of instructions in the second path of the branch instruction may be executed. The operations finally include determining that the first path of the branch instruction is the path taken and flushing the second set of instructions in the second path of the branch instruction.

In one or more other example embodiments, a computer program product for speculative execution of a branch instruction is disclosed. The computer program product includes a non-transitory storage medium readable by a processing circuit, the storage medium storing instructions executable by the processing circuit to cause a method to be performed. The method includes fetching the branch instruction and determining that the branch instruction is weakly predicted. Upon determining that the branch instruction is a weakly predicted branch instruction, a first path and a second path of the branch instruction may both be dispatched. Then, a first set of instructions in the first path of the branch instruction and a second set of instructions in the second path of the branch instruction may be executed. The method finally includes determining that the first path of the branch instruction is the path taken and flushing the second set of instructions in the second path of the branch instruction.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
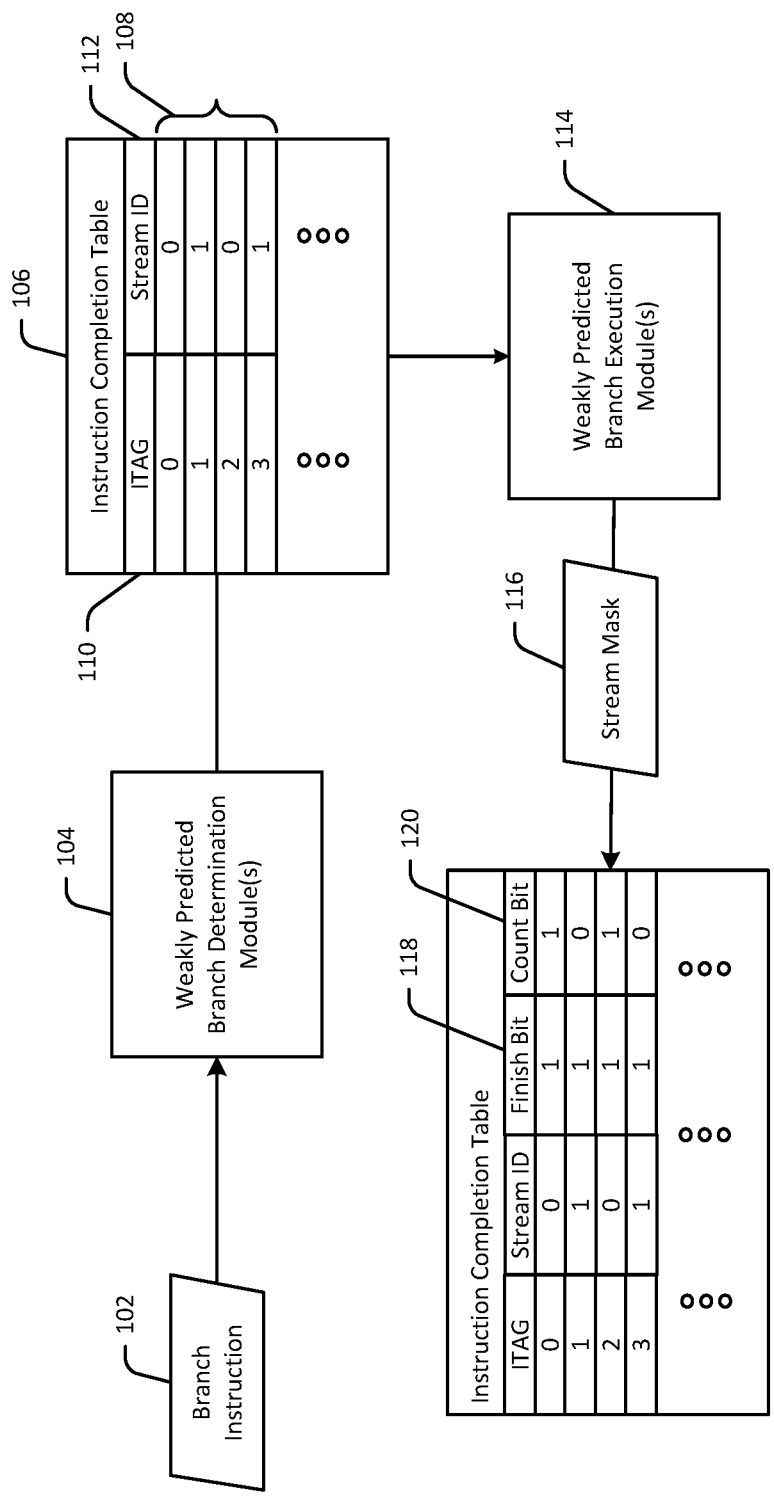
FIG. 1 is a schematic hybrid data flow/block diagram illustrating speculative execution of both paths of a weakly predicted branch instruction in accordance with example embodiments.

Example embodiments include, among other things, systems, methods, computer-readable media, techniques, and methodologies for performing speculative execution of both paths/branches of a weakly predicted branch instruction. In accordance with example embodiments, a branch instruction may be fetched from an instruction queue. If the branch instruction is determined to be a weakly predicted branch instruction, both paths of the branch instruction may be dispatched and executed. In accordance with example embodiments, a branch instruction may be determined to be a weakly predicted branch instruction if neither path of the branch instruction is significantly more likely to be taken than the other. More specifically, for example, a branch instruction may be determined to be weakly predicted if a difference in the respective likelihoods of the paths of the branch instruction being taken does not meet or exceed a threshold value.

In accordance with example embodiments, dispatching each branch/path of a weakly predicted branch instruction may include dispatching a first set of instructions corresponding to a first path of the branch instruction and dispatching a second set of instructions corresponding to the alternate path (a second path) of the branch instruction. In example embodiments, the first and second set of instructions may be dispatched in an interleaved manner. Interleaving the first and second set of instructions at dispatch may result in one more instructions in the second set being dispatched between instructions of the first set and vice versa. In example embodiments, each path of the branch instruction may be associated with a corresponding stream identifier. In particular, for each instruction that is dispatched, a corresponding entry may be created in an instruction completion table (ICT). A stream identifier may be inserted into each entry indicating to which path of a branch instruction the instruction belongs.

After speculative execution of a given dispatched instruction belonging to either path of a weakly predicted branch instruction occurs, a finish bit in a corresponding entry in the ICT may be set to a binary value (e.g., 1) indicating that execution of the instruction has finished. After the weakly predicted branch instruction is executed and the branch path taken is known, a stream identifier corresponding to the path of the branch instruction that was not taken may be broadcast. The broadcasted stream identifier may be used to identify each instruction in the path not taken that needs to be flushed. In example embodiments, flushing the instructions in the path not taken may include identifying those entries in the ICT that include the broadcasted stream identifier, and thus correspond to the instructions in the path not taken, and setting a count bit in each such entry to a binary value (e.g., 0) that indicates that the instruction corresponding to the ICT entry has been flushed. In example embodiments, if an ICT entry includes a count bit that is set to an appropriate binary value (e.g., 0), execution of the corresponding instruction may be ignored, which may effectively constitute flushing of the instruction from the instruction pipeline.

In example embodiments, the above-described process may proceed iteratively. For instance, during execution of respective instructions of either path of a weakly predicted branch instruction, another branch instruction may be encountered. If this additional branch instruction is determined to be a weakly predicted branch instruction, then both paths of this branch instruction may be speculatively executed as described above. Additional respective stream identifiers may be associated with both paths of the additional weakly predicted branch instruction. For instance, assume that both paths (e.g., path A and path B) of a first weakly predicted branch instruction are speculatively executed and assigned a first stream identifier and a second stream identifier, respectively. Further assume that another weakly predicted branch instruction is encountered during execution of path A. Then, both paths of this second weakly predicted branch instruction (e.g., path C and path D) may be speculatively executed and assigned a third stream identifier and a fourth stream identifier, respectively.

In certain example embodiments, speculative execution may be performed for both paths of any number of weakly predicted branch instructions encountered during speculative execution of a path of a prior weakly predicted branch instruction. In other example embodiments, both paths of an additional weakly predicted branch instruction encountered during speculative execution of instructions in a path of a prior weakly predicted branch instruction may be executed as long as doing so would not cause a threshold number of streams to be generated, or stated another way, a threshold number of stream identifiers to be utilized. Further, in example embodiments, when a path of a weakly predicted branch instruction is determined not to be taken, all instructions in the path not taken—including all instructions that are speculatively executed in both paths of each additional weakly predicted branch instruction encountered in the path not taken—may be flushed. Referring to the non-limiting example introduced above, if path B is the path taken after execution of the first weakly predicted branch instruction, then all instructions that were speculatively executed in path A—including all instructions speculatively executed in paths C and D of the second weakly predicted branch instruction encountered during execution of path A—may be flushed.

Various illustrative methods and corresponding data structures associated therewith will now be described. It should be noted that each operation of the method 200 may be performed by one or more of the program modules or the like depicted in FIG. 1 or 3, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
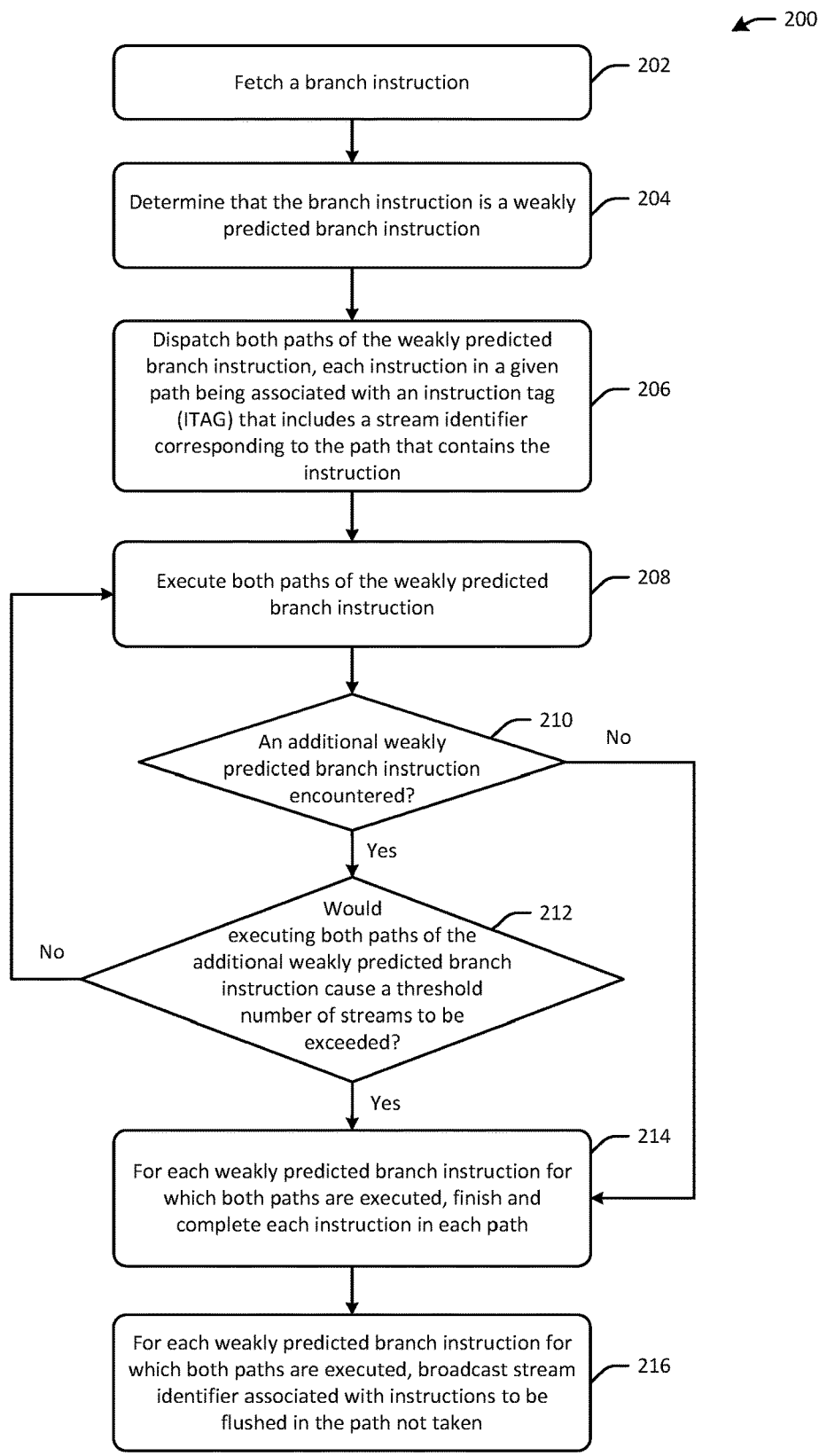
FIG. 2 is a process flow diagram of an illustrative method for performing speculative execution of both paths of one or more weakly predicted branch instructions in accordance with one or more example embodiments.

FIG. 1 is a schematic hybrid data flow/block diagram illustrating speculative execution of both paths of a weakly predicted branch instruction in accordance with example embodiments. FIG. 2 is a process flow diagram of an illustrative method 200 for performing speculative execution of both paths of one or more weakly predicted branch instructions in accordance with one or more example embodiments. FIGS. 1 and 2 will be described in conjunction with one another hereinafter.

At block 202 of the method 200, a branch instruction 102 may be fetched from an instruction queue. The branch instruction 102 may be, for example, a conditional jump instruction. At block 204 of the method 200, computer-executable instructions of one or more weakly predicted branch determination modules 104 may be executed to determine that the branch instruction 102 is a weakly predicted branch instruction. In accordance with example embodiments, the branch instruction 102 may be determined to be a weakly predicted branch instruction if neither path of the branch instruction 102 is significantly more likely to be taken than the other such as, for example, if a difference in the respective likelihoods of the paths of the branch instruction 102 being taken does not meet or exceed a threshold value. The threshold value may represent a desired threshold difference in likelihood of being taken between the paths of a branch instruction.

At block 206 of the method 200, computer-executable instructions of the weakly predicted branch determination module(s) 104 may be executed to dispatch both paths of the weakly predicted branch instruction 102. In accordance with example embodiments, dispatching each branch of the weakly predicted branch instruction 102 may include dispatching a first set of instructions corresponding to a first path of the branch instruction 102 and dispatching a second set of instructions corresponding to the alternate path (a second path) of the branch instruction 102. In example embodiments, each path of the branch instruction 102 may be associated with a corresponding stream identifier. In particular, for each instruction that is dispatched, a corresponding entry may be created in an instruction completion table (ICT) 106. A stream identifier 112 may be inserted into an entry to indicate which path of the branch instruction 102 the instruction belongs to.

The ICT 106 may include a plurality of entries. Each entry may correspond to a particular instruction that has been dispatched. Each entry may include an instruction tag (ITAG) 110 identifying the instruction. The ICT 106 is illustratively depicted in FIG. 1 as including a group of entries 108 that correspond to instructions in both paths of the weakly predicted branch instruction 102. As previously noted, each entry 108 includes a stream identifier 112 that indicates to which path of the branch instruction 102 the corresponding instruction belongs. The entries 108 are interleaved in the ICT 106 reflecting an interleaving of the corresponding instructions at dispatch. In particular, all instructions in a first set of instructions in a first path of the branch instruction 102 may not be dispatched consecutively. Similarly, all instructions in a second set of instructions in a second path of the branch instruction 102 may not be dispatched consecutively. Rather, instructions in the first set and the second set may be dispatched in an interleaved manner. This may then result in interleaving of the corresponding entries 108 in the ICT 106.

For instance, a first entry depicted in the ICT 106 includes the ITAG 0 and the stream identifier 0 indicating, for example, that the instruction corresponding to the first entry belongs to a first path of the branch instruction 102. The next entry in the ICT 106, however, does not correspond to an instruction in the first path of the branch instruction 102. Rather, the second entry depicted in the ICT 106 includes the ITAG 1 and the stream identifier 1 indicating that the instruction corresponding to the second entry belongs to the second path of the branch instruction 102. The instructions in both paths of the branch instruction 102 may be interleaved in any manner, with any number of instructions in a given path of the branch instruction 102 being dispatched between instructions in the alternate path of the branch instruction 102. As such, an entry in the ICT 106 that includes a stream identifier corresponding to a particular path of the branch instruction 102 may be followed by any number of entries in the ICT 106 that include a stream identifier corresponding to the alternate path before another entry is encountered that includes the stream identifier corresponding to the particular path. It should be appreciated that the fields depicted in the ICT 106 in FIG. 1 are merely illustratively and that additional fields may be provided.

At block 208 of the method 200, computer-executable instructions of one or more weakly predicted branch execution modules 114 may be executed to speculatively execute both paths of the weakly predicted branch instruction 102. During speculative execution of either path of the branch instruction 102, computer-executable instructions of the weakly predicted branch execution module(s) 114 may be executed at block 210 of the method 200 to determine whether an additional weakly predicted branch instruction has been encountered. In particular, in example embodiments, speculative execution of both paths of the weakly predicted branch instruction 102 may proceed iteratively such that if an additional branch instruction is encountered during execution of respective instructions of either path of the weakly predicted branch instruction 102 (a positive determination at block 210), then both paths of the additional branch instruction may also be speculatively executed. Additional respective stream identifiers may be associated with both paths of the additional weakly predicted branch instruction that are speculatively executed.

More specifically, in response to a positive determination at block 210, computer-executable instructions of the weakly predicted branch execution module(s) 114 may be executed at block 212 of the method 200 to determine whether speculative execution of both paths of the additional weakly predicted branch instruction would cause a threshold number of streams to be generated, or in other words, a threshold number of stream identifiers to be utilized. In response to a negative determination at block 212, the method 200 may proceed iteratively and each path of the additional weakly predicted branch instruction may be speculatively executed. In example embodiments, each such weakly predicted branch instruction that is encountered may undergo speculative execution of both paths as long as the number of distinct stream identifiers needed to identify each speculatively executed path of each weakly predicted branch instruction does not exceed a threshold number of allowable streams.

For instance, assume that both paths (e.g., path A and path B) of a first weakly predicted branch instruction are speculatively executed and assigned a first stream identifier and a second stream identifier, respectively. Further assume that another weakly predicted branch instruction is encountered during speculative execution of path A. Then, both paths of this second weakly predicted branch instruction (e.g., path C and path D) may be speculatively executed and assigned a third stream identifier and a fourth stream identifier, respectively, as long as the maximum number of allowable streams is not less than four. Further assume that another (a third) weakly predicted branch instruction is encountered during speculative execution of path C. If the maximum number of allowable streams is five, then both paths of the third weakly predicted branch instruction would not be speculatively executed because doing so would require utilizing a fifth stream identifier and a sixth stream identifier.

In response to a negative determination at block 210 (indicating that no further additional weakly predicted branch instructions have been encountered during speculative execution) or in response to a positive determination at block 212 (indicating that a maximum number of streams/ stream identifiers are in use), the method 200 may proceed to block 214, where computer-executable instructions of the weakly predicted branch execution module(s) 114 may be executed to finish and complete each instruction in each speculatively executed path of each weakly predicted branch instruction for which both paths are speculatively executed. For example, after speculative execution of a given dispatched instruction belonging to either path of a weakly predicted branch instruction (e.g., the branch instruction 102) occurs, a finish bit 118 in a corresponding entry in the ICT 106 may be set to a binary value (e.g., 1) indicating that execution of the instruction has finished. In certain example embodiments, each instruction having a corresponding ICT entry with the finish bit 118 set to indicate that execution of the instruction has finished may be auto-completed. However, as described in more detail below, an additional binary value may be set in each ICT entry corresponding to each instruction to be flushed to indicate that execution of the instruction is to be ignored.

In particular, after a weakly predicted branch instruction (e.g., branch instruction 102) is executed and the branch path taken is known, computer-executable instructions of the weakly predicted branch execution module(s) 114 may be executed at block 216 of the method 200 to broadcast a stream identifier corresponding to the path of the branch instruction that was not taken. The broadcasted stream identifier may be used to identify each instruction in the path not taken that needs to be flushed. A stream identifier identifying the instructions in the path not taken that need to be flushed may be broadcast for each weakly predicted branch instruction for which both paths are speculatively executed.

In example embodiments, flushing the instructions in the path not taken may include identifying those entries in the ICT 106 that include the broadcasted stream identifier, and thus, that correspond to the instructions in the path not taken, and setting a count bit 120 in each such entry to a binary value (e.g., 0) that indicates that the instruction corresponding to the ICT entry has been flushed. In example embodiments, if an ICT entry includes a count bit that is set to an appropriate binary value (e.g., 0), execution of the corresponding instruction may be ignored regardless of how the finish bit 118 is set, which may effectively constitute flushing of the instruction from the instruction pipeline. In example embodiments, after a stream identifier has been broadcasted and instructions corresponding to ICT entries that include the broadcasted stream identifier have been flushed, the stream identifier may become available for use again in connection with future speculative execution of a path of a weakly predicted branch instruction.

Further, in example embodiments, when a path of a weakly predicted branch instruction is determined not to be taken, all instructions in the path not taken—including all instructions that are speculatively executed in both paths of each additional weakly predicted branch instruction encountered in the path not taken—may be flushed. Referring to non-limiting example introduced above, if path B is the path taken after execution of the first weakly predicted branch instruction, then all instructions that were speculatively executed in path A—including all instructions speculatively executed in paths C and D of the second weakly predicted branch instruction encountered during execution of path A—may be flushed. In such example embodiments, a stream mask 116 may be broadcast at block 216 of the method 200 that identifies each stream identifier corresponding to each speculatively executed branch path whose instructions need to be flushed. In the non-limiting example above, the stream mask 116 may include the first stream identifier (which corresponds to all instructions in path A which was not taken) as well as the third stream identifier and the fourth stream identifier which correspond to the additional speculatively executed paths (paths C and D) of the second weakly predicted branch instruction encountered during speculative execution of the instructions in path A.

Example embodiments provide various technical features, technical effects, and/or improvements to computer technology. For example, example embodiments include technical features for speculatively executing both paths of a weakly predicted branch instruction which results in the technical effect of speculatively executing instructions in a path taken for a branch instruction even if instructions in the path not taken are speculatively executed and subsequently must be flushed. This technical effect provides an improvement to computer technology—specifically an improvement to computer microarchitecture and instruction execution.

In particular, example embodiments provide an improvement over conventional microarchitectures that utilize branch prediction for all branch instructions regardless of how likely it is for the predicted path to be taken. If a branch misprediction is made in conventional microarchitectures, then all instructions that are speculatively executed in the predicted branch need to be flushed and instructions in the taken branch need to be executed. In the case of a branch instruction that is weakly predicted (i.e., where the likelihood of either branch being taken does not significantly differ), conventional microarchitectures may need to flush the instruction pipeline nearly 50 percent of the time, which may lead to considerable delay. In contrast, in accordance with example embodiments of the invention, both paths of a weakly predicted branch instruction are speculatively executed and instructions corresponding to both paths may be dispatched, and thus executed, in an interleaved manner such that even when instructions in a particular path not taken are flushed, the instructions in the path taken have already been executed. As a result, example embodiments of the invention avoid the delay associated with branch misprediction for weakly predicted branch instructions in conventional microarchitectures, and thus, provide an improvement to computer technology by increasing the efficiency with which weakly predicted branch instructions are executed in a pipelined processor.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 3:
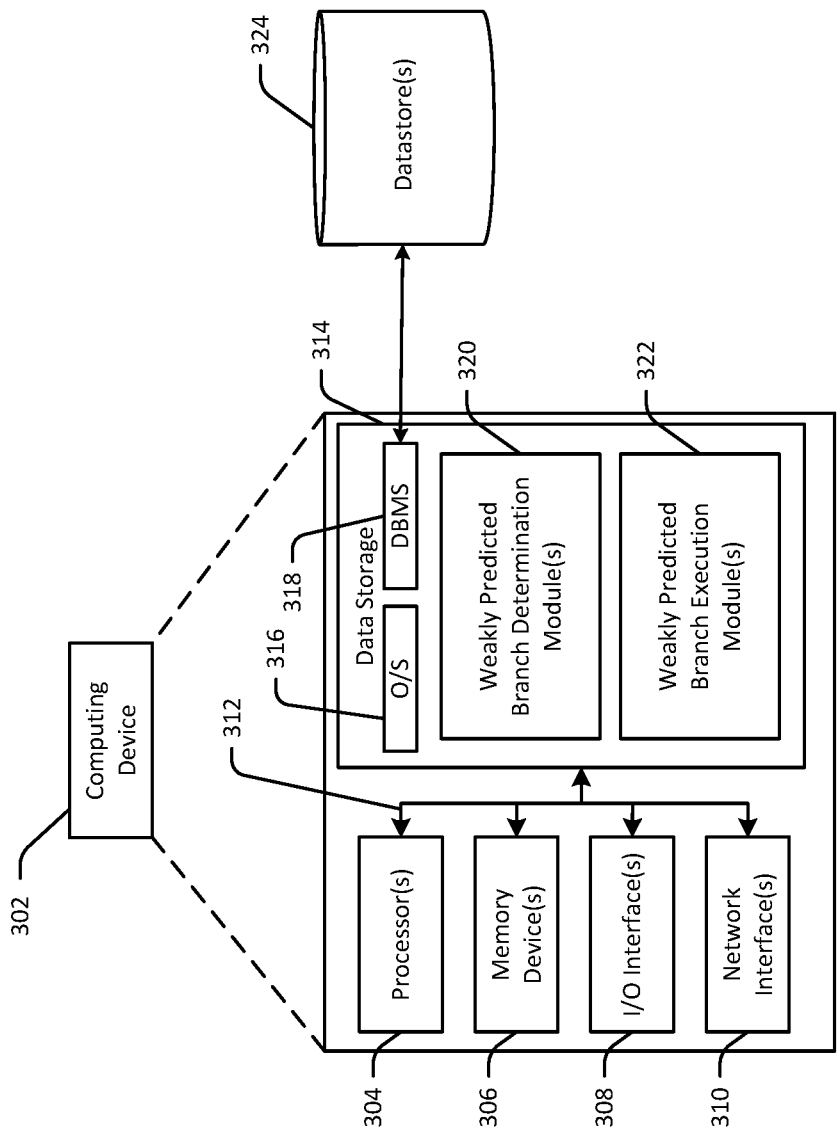
FIG. 3 is a schematic diagram of an illustrative computing device configured to implement one or more example embodiments.

FIG. 3 is a schematic diagram of an illustrative computing device 302 configured to implement one or more example embodiments of the disclosure. The computing device 302 may be any suitable device including, without limitation, a server, a personal computer (PC), a tablet, a smartphone, a wearable device, a voice-enabled device, or the like. While any particular component of the computing device 302 may be described herein in the singular, it should be appreciated that multiple instances of any such component may be provided, and functionality described in connection with a particular component may be distributed across multiple ones of such a component.

Although not depicted in FIG. 3, the computing device 302 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 302 may include one or more processors (processor(s)) 304, one or more memory devices 306 (generically referred to herein as memory 306), one or more input/output ("I/O") interface(s) 308, one or more network interfaces 310, and data storage 314. The computing device 302 may further include one or more buses 312 that functionally couple various components of the computing device 302.

The bus(es) 312 may include at least one of a system bus, a memory bus, an address bus, or a message bus, and may permit the exchange of information (e.g., data (including computer-executable code), signaling, etc.) between various components of the computing device 302. The bus(es) 312 may include, without limitation, a memory bus or a memory controller, a peripheral bus, an accelerated graphics port, and so forth. The bus(es) 312 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 306 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 306 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 306 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 314 may include removable storage and/or non-removable storage including, but not limited to, magnetic storage, optical disk storage, and/or tape storage. The data storage 314 may provide non-volatile storage of computer-executable instructions and other data. The memory 306 and the data storage 314, removable and/or non-removable, are examples of computer-readable storage media (CRSM) as that term is used herein.

The data storage 314 may store computer-executable code, instructions, or the like that may be loadable into the memory 306 and executable by the processor(s) 304 to cause the processor(s) 304 to perform or initiate various operations. The data storage 314 may additionally store data that may be copied to memory 306 for use by the processor(s) 304 during the execution of the computer-executable instructions. Moreover, output data generated as a result of execution of the computer-executable instructions by the processor(s) 304 may be stored initially in memory 306 and may ultimately be copied to data storage 314 for non-volatile storage.

More specifically, the data storage 314 may store one or more operating systems (O/S) 316; one or more database management systems (DBMS) 318 configured to access the memory 306 and/or one or more external datastores 324; and one or more program modules, applications, engines, managers, computer-executable code, scripts, or the like such as, for example, one or more weakly predicted branch determination modules 320 and one or more weakly predicted branch execution modules 322. Any of the components depicted as being stored in data storage 314 may include any combination of software, firmware, and/or hardware. The software and/or firmware may include computer-executable instructions (e.g., computer-executable program code) that may be loaded into the memory 306 for execution by one or more of the processor(s) 304 to perform any of the operations described earlier in connection with correspondingly named modules.

Although not depicted in FIG. 3, the data storage 314 may further store various types of data utilized by components of the computing device 302 (e.g., data stored in the datastore(s) 324). Any data stored in the data storage 314 may be loaded into the memory 306 for use by the processor(s) 304 in executing computer-executable instructions. In addition, any data stored in the data storage 314 may potentially be stored in the external datastore(s) 324 and may be accessed via the DBMS 318 and loaded in the memory 306 for use by the processor(s) 304 in executing computer-executable instructions.

The processor(s) 304 may be configured to access the memory 306 and execute computer-executable instructions loaded therein. For example, the processor(s) 304 may be configured to execute computer-executable instructions of the various program modules, applications, engines, managers, or the like of the computing device 302 to cause or facilitate various operations to be performed in accordance with one or more embodiments of the disclosure. The processor(s) 304 may include any suitable processing unit capable of accepting data as input, processing the input data in accordance with stored computer-executable instructions, and generating output data. The processor(s) 304 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 304 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 304 may be capable of supporting any of a variety of instruction sets.

Referring now to other illustrative components depicted as being stored in the data storage 314, the O/S 316 may be loaded from the data storage 314 into the memory 306 and may provide an interface between other application software executing on the computing device 302 and hardware resources of the computing device 302. More specifically, the O/S 316 may include a set of computer-executable instructions for managing hardware resources of the computing device 302 and for providing common services to other application programs. In certain example embodiments, the O/S 316 may include or otherwise control the execution of one or more of the program modules, engines, managers, or the like depicted as being stored in the data storage 314. The O/S 316 may include any operating system now known or which may be developed in the future including, but not limited to, any server operating system, any mainframe operating system, or any other proprietary or non-proprietary operating system.

The DBMS 318 may be loaded into the memory 306 and may support functionality for accessing, retrieving, storing, and/or manipulating data stored in the memory 306, data stored in the data storage 314, and/or data stored in external datastore(s) 324. The DBMS 318 may use any of a variety of database models (e.g., relational model, object model, etc.) and may support any of a variety of query languages. The DBMS 318 may access data represented in one or more data schemas and stored in any suitable data repository. Data stored in the datastore(s) 324 may include, for example, a number of current stream identifiers in use, a threshold number of stream identifiers, a threshold value for determining if a branch instruction is a weakly predicted branch instruction, ICT entry data, and so forth. External datastore(s) 324 that may be accessible by the computing device 302 via the DBMS 318 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 302, the input/output (I/O) interface(s) 308 may facilitate the receipt of input information by the computing device 302 from one or more I/O devices as well as the output of information from the computing device 302 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 302 or may be separate. The I/O devices may further include, for example, any number of peripheral devices such as data storage devices, printing devices, and so forth.

The I/O interface(s) 308 may also include an interface for an external peripheral device connection such as universal serial bus (USB), FireWire, Thunderbolt, Ethernet port or other connection protocol that may connect to one or more networks. The I/O interface(s) 308 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 302 may further include one or more network interfaces 310 via which the computing device 302 may communicate with any of a variety of other systems, platforms, networks, devices, and so forth. The network interface(s) 310 may enable communication, for example, with one or more other devices via one or more of the network(s).

It should be appreciated that the program modules/engines depicted in FIG. 3 as being stored in the data storage 314 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 302 and/or other computing devices accessible via one or more networks, may be provided to support functionality provided by the modules depicted in FIG. 3 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 3 may be implemented, at least partially, in hardware and/or firmware across any number of devices.

It should further be appreciated that the computing device 302 may include alternate and/or additional hardware, software, or firmware components beyond those described or depicted without departing from the scope of the disclosure. More particularly, it should be appreciated that software, firmware, or hardware components depicted as forming part of the computing device 302 are merely illustrative and that some components may not be present or additional components may be provided in various embodiments. While various illustrative modules have been depicted and described as software modules stored in data storage 314, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 may be performed by a computing device 302 having the illustrative configuration depicted in FIG. 3, or more specifically, by one or more program modules, engines, applications, or the like executable on such a device. It should be appreciated, however, that such operations may be implemented in connection with numerous other device configurations.

The operations described and depicted in the illustrative method of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for speculative execution of a branch instruction, the method comprising:
    fetching the branch instruction;
    determining that the branch instruction is weakly predicted based at least in part on a determination that a difference in respective likelihoods of paths of the branch instruction being taken are less than a threshold value;
    dispatching a first path and a second path of the branch instruction, wherein the first path comprises a first set of instructions, the second path comprises a second set of instructions, and wherein the first set of instructions and the second set of instructions are dispatched in an interleaved manner;
    executing the first set of instructions in the first path of the branch instruction;
    executing the second set of instructions in the second path of the branch instruction;
    determining that the first path of the branch instruction is the path taken; and
    flushing the second set of instructions in the second path of the branch instruction.

2. The computer-implemented method of claim 1, wherein dispatching the first path and the second path of the branch instruction comprises:
    associating a first stream identifier with each instruction in the first set of instructions by inserting the first stream identifier in a respective instruction tag corresponding to each instruction in the first set of instructions; and
    associating a second stream identifier with each instruction in the second set of instructions by inserting the second stream identifier in a respective instruction tag corresponding to each instruction in the first set of instructions.

3. The computer-implemented method of claim 2, further comprising broadcasting the second stream identifier to indicate that each instruction associated with the second stream identifier is to be flushed.

4. The computer-implemented method of claim 3, wherein flushing the second set of instructions comprises setting a count bit in each respective instruction tag corresponding to each instruction in the second set of instructions to a binary value that indicates that the instruction has been flushed.

5. The computer-implemented method of claim 4, wherein the binary value is a first binary value, the method further comprising:
    setting a finish bit in each respective instruction tag corresponding to each instruction in the first set of instructions and each instruction in the second set of instructions to a second binary value indicating that execution of the instruction has finished; and
    completing each instruction corresponding to a respective instruction tag with the finish bit set to the second binary value.

6. The computer-implemented method of claim 1, wherein the branch instruction is a first branch instruction, the method further comprising:
    identifying a second branch instruction during execution of the second set of instructions in the second path of the first branch instruction;
    determining that the second branch instruction is weakly predicted;
    dispatching a first path and a second path of the second branch instruction;
    executing a first set of instructions in the first path of the second branch instruction;
    executing a second set of instructions in the second path of the second branch instruction; and
    flushing, based at least in part on determining that the first path of the first branch instruction is the path taken, the first set of instructions and the second set of instructions in the first path of the second branch instruction and the second path of the second branch instruction, respectively.

7. The computer-implemented method of claim 6, further comprising determining that executing both the first path and the second path of the second branch instruction would not cause a threshold number of streams to be exceeded.

8. A system for speculative execution of a branch instruction, the system comprising:
    at least one memory storing computer-executable instructions; and
    at least one processor, wherein the at least one processor is configured to access the at least one memory and execute the computer-executable instructions to:
        fetch the branch instruction;
        determine that the branch instruction is weakly predicted based at least in part on a determination that a difference in respective likelihoods of paths of the branch instruction being taken are less than a threshold value;
        dispatch a first path and a second path of the branch instruction, wherein the first path comprises a first set of instructions, the second path comprises a second set of instructions, and wherein the first set of instructions and the second set of instructions are dispatched in an interleaved manner;

execute the first set of instructions in the first path of the branch instruction;
execute the second set of instructions in the second path of the branch instruction;
determine that the first path of the branch instruction is the path taken; and
flush the second set of instructions in the second path of the branch instruction.

9. The system of claim 8, wherein the at least one processor is configured to dispatch the first path and the second path of the branch instruction by executing the computer-executable instructions to:
associate a first stream identifier with each instruction in the first set of instructions by inserting the first stream identifier in a respective instruction tag corresponding to each instruction in the first set of instructions; and
associate a second stream identifier with each instruction in the second set of instructions by inserting the second stream identifier in a respective instruction tag corresponding to each instruction in the first set of instructions.

10. The system of claim 9, wherein the at least one processor is further configured to execute the computer-executable instructions to broadcast the second stream identifier to indicate that each instruction associated with the second stream identifier is to be flushed.

11. The system of claim 10, wherein the at least one processor is configured to flush the second set of instructions by executing the computer-executable instructions to set a count bit in each respective instruction tag corresponding to each instruction in the second set of instructions to a binary value that indicates that the instruction has been flushed.

12. The system of claim 11, wherein the binary value is a first binary value, and wherein the at least one processor is further configured to execute the computer-executable instructions to:
set a finish bit in each respective instruction tag corresponding to each instruction in the first set of instructions and each instruction in the second set of instructions to a second binary value indicating that execution of the instruction has finished; and
complete each instruction corresponding to a respective instruction tag with the finish bit set to the second binary value.

13. The system of claim 8, wherein the branch instruction is a first branch instruction, and wherein the at least one processor is further configured to execute the computer-executable instructions to:
identify a second branch instruction during execution of the second set of instructions in the second path of the first branch instruction;
determine that the second branch instruction is weakly predicted;
dispatch a first path and a second path of the second branch instruction;
execute a first set of instructions in the first path of the second branch instruction;
execute a second set of instructions in the second path of the second branch instruction; and
flush, based at least in part on determining that the first path of the first branch instruction is the path taken, the first set of instructions and the second set of instructions in the first path of the second branch instruction and the second path of the second branch instruction, respectively.

14. The system of claim 13, wherein the at least one processor is further configured to execute the computer-executable instructions to determine that executing both the first path and the second path of the second branch instruction would not cause a threshold number of streams to be exceeded.

15. A computer program product for speculative execution of a branch instruction, the computer program product comprising a storage medium readable by a processing circuit, the storage medium storing instructions executable by the processing circuit to cause a method to be performed, the method comprising:
fetching the branch instruction;
determining that the branch instruction is weakly predicted based at least in part on a determination that a difference in respective likelihoods of paths of the branch instruction being taken are less than a threshold value;
dispatching a first path and a second path of the branch instruction, wherein the first path comprises a first set of instructions, the second path comprises a second set of instructions, and wherein the first set of instructions and the second set of instructions are dispatched in an interleaved manner;
executing the first set of instructions in the first path of the branch instruction;
executing the second set of instructions in the second path of the branch instruction;
determining that the first path of the branch instruction is the path taken; and
flushing the second set of instructions in the second path of the branch instruction.

16. The computer program product of claim 15, wherein dispatching the first path and the second path of the branch instruction comprises:
associating a first stream identifier with each instruction in the first set of instructions by inserting the first stream identifier in a respective instruction tag corresponding to each instruction in the first set of instructions; and
associating a second stream identifier with each instruction in the second set of instructions by inserting the second stream identifier in a respective instruction tag corresponding to each instruction in the first set of instructions.

17. The computer program product of claim 16, the method further comprising broadcasting the second stream identifier to indicate that each instruction associated with the second stream identifier is to be flushed.

18. The computer program product of claim 17, wherein flushing the second set of instructions comprises setting a count bit in each respective instruction tag corresponding to each instruction in the second set of instructions to a binary value that indicates that the instruction has been flushed.

19. The computer program product of claim 18, wherein the binary value is a first binary value, the method further comprising:
setting a finish bit in each respective instruction tag corresponding to each instruction in the first set of instructions and each instruction in the second set of instructions to a second binary value indicating that execution of the instruction has finished; and
completing each instruction corresponding to a respective instruction tag with the finish bit set to the second binary value.

20. The computer program product of claim 15, wherein the branch instruction is a first branch instruction, the method further comprising:

identifying a second branch instruction during execution of the second set of instructions in the second path of the first branch instruction;
determining that the second branch instruction is weakly predicted;
determining that executing both the first path and the second path of the second branch instruction would not cause a threshold number of streams to be exceeded
dispatching a first path and a second path of the second branch instruction;
executing a first set of instructions in the first path of the second branch instruction;
executing a second set of instructions in the second path of the second branch instruction; and
flushing, based at least in part on determining that the first path of the first branch instruction is the path taken, the first set of instructions and the second set of instructions in the first path of the second branch instruction and the second path of the second branch instruction, respectively.

* * * * *